US008922657B2

(12) United States Patent
Calman et al.

(10) Patent No.: US 8,922,657 B2
(45) Date of Patent: Dec. 30, 2014

(54) REAL-TIME VIDEO IMAGE ANALYSIS FOR PROVIDING SECURITY

(75) Inventors: Matthew A. Calman, Charlotte, NC (US); Erik Stephen Ross, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 425 days.

(21) Appl. No.: 13/342,070

(22) Filed: Jan. 1, 2012

(65) Prior Publication Data

US 2012/0229647 A1 Sep. 13, 2012

Related U.S. Application Data

(60) Provisional application No. 61/450,213, filed on Mar. 8, 2011, provisional application No. 61/508,973, filed on Jul. 18, 2011.

(51) Int. Cl.

| | |
|---|---|
| ***H04N 7/18*** | (2006.01) |
| ***G08B 1/08*** | (2006.01) |
| ***G06F 3/048*** | (2013.01) |
| ***G08B 13/196*** | (2006.01) |
| ***G08B 21/04*** | (2006.01) |
| ***G08B 21/24*** | (2006.01) |
| ***G08B 25/00*** | (2006.01) |
| *G08B 17/10* | (2006.01) |
| *G08B 29/18* | (2006.01) |

(52) U.S. Cl.
CPC .... *G08B 13/19621* (2013.01); *G08B 13/19615* (2013.01); *G08B 21/0423* (2013.01); *G08B 21/0476* (2013.01); *G08B 21/24* (2013.01); *G08B 25/005* (2013.01); *G08B 17/10* (2013.01); *G08B 29/181* (2013.01)
USPC ...................... 348/158; 340/539.13; 715/810

(58) Field of Classification Search
CPC ................. H04N 2101/00; H04N 2201/0084; H04N 7/181; H04N 7/185; H04N 7/188; H04N 1/00307
USPC ........................................................ 348/158
See application file for complete search history.

(56) References Cited

U.S. PATENT DOCUMENTS

| | | | |
|---|---|---|---|
| 5,768,633 | A | 6/1998 | Allen et al. |
| 6,202,055 | B1 | 3/2001 | Houvener et al. |

(Continued)

FOREIGN PATENT DOCUMENTS

| | | | |
|---|---|---|---|
| JP | 2007-266143 | | 10/2007 |
| KR | 1020090047614 | A | 5/2009 |
| KR | 1020090105734 | A | 10/2009 |

OTHER PUBLICATIONS

International Search Report and Written Opinion for International Application No. PCT/US12/27890 mailed Feb. 5, 2013.

(Continued)

*Primary Examiner* — Hee-Yong Kim

(74) *Attorney, Agent, or Firm* — Michael A. Springs; Moore & Van Allen PLLC; Nicholas C. Russell

(57) ABSTRACT

System, method, and computer program product are provided for using real-time video analysis to provide the user of mobile devices with security, no matter the user's location. Through the use of real-time vision object recognition objects, logos, artwork, products, locations, and other features that can be recognized in the real-time video stream and frequented locations of the user can be established. In this way, a baseline layout of the frequented location is determined, such that the objects and individuals typically in the frequented area are recognized. The system may continue to take real-time video images of the frequented location, such that if a variation in the baseline layout occurs, the change may be alerted. In this way, a security compromise, such as a break-in to a user's home may be detected by the system and thus the system may notify the user or the appropriate authorities.

24 Claims, 6 Drawing Sheets

(56) References Cited

U.S. PATENT DOCUMENTS

| | | | | |
|---|---|---|---|---|
| 6,522,772 | B1 | 2/2003 | Morrison et al. | |
| 6,533,392 | B1 | 3/2003 | Koitbashi | |
| 6,636,249 | B1 | 10/2003 | Rekimoto | |
| 6,674,993 | B1 | 1/2004 | Tarbouriech | |
| 6,856,965 | B1 | 2/2005 | Stinson et al. | |
| 7,016,532 | B2 | 3/2006 | Boncyk et al. | |
| 7,062,454 | B1 | 6/2006 | Giannini et al. | |
| 7,110,964 | B2 | 9/2006 | Tengler et al. | |
| 7,154,529 | B2 | 12/2006 | Hoke et al. | |
| 7,155,228 | B2 | 12/2006 | Rappaport et al. | |
| 7,309,015 | B2 | 12/2007 | Frantz et al. | |
| 7,403,652 | B2 * | 7/2008 | Boncyk et al. | 382/165 |
| 7,412,081 | B2 | 8/2008 | Doi | |
| 7,424,303 | B2 | 9/2008 | Al-Sarawi | |
| 7,477,780 | B2 | 1/2009 | Boncyk et al. | |
| 7,526,280 | B2 | 4/2009 | Jung et al. | |
| 7,564,469 | B2 | 7/2009 | Cohen | |
| 7,565,008 | B2 | 7/2009 | Boncyk et al. | |
| 7,615,446 | B2 | 11/2009 | Kim et al. | |
| 7,634,448 | B1 | 12/2009 | Ramachandran | |
| 7,680,324 | B2 | 3/2010 | Boncyk et al. | |
| 7,693,585 | B2 | 4/2010 | Kalan et al. | |
| 7,735,728 | B2 | 6/2010 | Wallerstorfer | |
| 7,775,437 | B2 | 8/2010 | Cohen | |
| 7,792,738 | B2 | 9/2010 | Channell | |
| 7,840,031 | B2 | 11/2010 | Albertson et al. | |
| 7,881,243 | B2 | 2/2011 | Hardy et al. | |
| 7,881,529 | B2 | 2/2011 | Boncyk et al. | |
| 7,899,243 | B2 | 3/2011 | Boncyk et al. | |
| 7,899,252 | B2 | 3/2011 | Boncyk et al. | |
| 7,962,128 | B2 | 6/2011 | Neven et al. | |
| 7,970,649 | B2 | 6/2011 | Wu | |
| 7,983,971 | B1 | 7/2011 | McLuckie et al. | |
| 7,988,060 | B2 | 8/2011 | Killian et al. | |
| 8,121,944 | B2 | 2/2012 | Norman et al. | |
| 8,138,930 | B1 | 3/2012 | Heath | |
| 8,144,944 | B2 * | 3/2012 | Ishii | 382/118 |
| 8,145,594 | B2 | 3/2012 | Geisner et al. | |
| 8,149,113 | B2 * | 4/2012 | Diem | 340/539.13 |
| 8,154,428 | B2 | 4/2012 | Do et al. | |
| 8,180,377 | B2 * | 5/2012 | Yang et al. | 455/456.3 |
| 8,233,673 | B2 * | 7/2012 | Britz et al. | 382/117 |
| 8,385,971 | B2 | 2/2013 | Rhoads et al. | |
| 8,392,450 | B2 | 3/2013 | Blanchflower et al. | |
| 8,438,110 | B2 | 5/2013 | Calman et al. | |
| 8,571,888 | B2 | 10/2013 | Calman et al. | |
| 2001/0022615 | A1 * | 9/2001 | Fernandez et al. | 348/143 |
| 2002/0124188 | A1 | 9/2002 | Sherman et al. | |
| 2003/0064705 | A1 | 4/2003 | Desiderio | |
| 2004/0021584 | A1 | 2/2004 | Hartz, Jr. et al. | |
| 2004/0024709 | A1 | 2/2004 | Yu et al. | |
| 2005/0052549 | A1 * | 3/2005 | Schinner et al. | 348/231.2 |
| 2005/0162523 | A1 | 7/2005 | Darrell et al. | |
| 2006/0100951 | A1 | 5/2006 | Mylet et al. | |
| 2007/0140595 | A1 | 6/2007 | Taylor et al. | |
| 2007/0162971 | A1 | 7/2007 | Blom et al. | |
| 2007/0279521 | A1 | 12/2007 | Cohen | |
| 2008/0040278 | A1 * | 2/2008 | DeWitt | 705/44 |
| 2008/0070198 | A1 | 3/2008 | Dempsey | |
| 2008/0070546 | A1 * | 3/2008 | Lee | 455/404.2 |
| 2008/0077882 | A1 * | 3/2008 | Kramer et al. | 715/810 |
| 2008/0214210 | A1 | 9/2008 | Rasanen et al. | |
| 2008/0243721 | A1 | 10/2008 | Joao | |
| 2008/0267447 | A1 | 10/2008 | Kelusky et al. | |
| 2008/0268876 | A1 | 10/2008 | Gelfand et al. | |
| 2009/0006191 | A1 | 1/2009 | Arankalle et al. | |
| 2009/0061949 | A1 | 3/2009 | Chen | |
| 2009/0089131 | A1 | 4/2009 | Moukas et al. | |
| 2009/0094125 | A1 | 4/2009 | Killian et al. | |
| 2009/0102859 | A1 | 4/2009 | Athsani et al. | |
| 2009/0121271 | A1 | 5/2009 | Son et al. | |
| 2009/0140839 | A1 | 6/2009 | Bishop et al. | |
| 2009/0144164 | A1 | 6/2009 | Wane et al. | |
| 2009/0171850 | A1 | 7/2009 | Yuval | |
| 2009/0181640 | A1 * | 7/2009 | Jones | 455/404.2 |
| 2009/0182748 | A1 | 7/2009 | Walker | |
| 2009/0204511 | A1 | 8/2009 | Tsang | |
| 2009/0237546 | A1 | 9/2009 | Bloebaum et al. | |
| 2009/0250515 | A1 | 10/2009 | Todd et al. | |
| 2009/0251963 | A1 | 10/2009 | Seol et al. | |
| 2010/0002204 | A1 | 1/2010 | Jung et al. | |
| 2010/0130226 | A1 | 5/2010 | Arrasvuori et al. | |
| 2010/0185529 | A1 | 7/2010 | Chesnut et al. | |
| 2010/0228776 | A1 | 9/2010 | Melkote et al. | |
| 2010/0250581 | A1 | 9/2010 | Chau | |
| 2010/0255795 | A1 | 10/2010 | Rubinsky et al. | |
| 2010/0277412 | A1 | 11/2010 | Pryor | |
| 2010/0281432 | A1 | 11/2010 | Geisner et al. | |
| 2010/0306712 | A1 | 12/2010 | Snook et al. | |
| 2010/0306715 | A1 | 12/2010 | Geisner et al. | |
| 2011/0022540 | A1 | 1/2011 | Stern et al. | |
| 2011/0034176 | A1 | 2/2011 | Lord et al. | |
| 2011/0077046 | A1 | 3/2011 | Durand et al. | |
| 2011/0079639 | A1 | 4/2011 | Khan | |
| 2011/0106622 | A1 | 5/2011 | Kuhlman et al. | |
| 2011/0119155 | A1 | 5/2011 | Hammad et al. | |
| 2011/0202460 | A1 | 8/2011 | Buer et al. | |
| 2011/0202466 | A1 | 8/2011 | Carter | |
| 2012/0100915 | A1 | 4/2012 | Margalit et al. | |
| 2012/0140068 | A1 * | 6/2012 | Monroe et al. | 348/143 |
| 2012/0313781 | A1 * | 12/2012 | Barker et al. | 340/540 |
| 2012/0330753 | A1 | 12/2012 | Urbanski et al. | |
| 2013/0011111 | A1 | 1/2013 | Abraham et al. | |

OTHER PUBLICATIONS

International Search Report and Written Opinion dated Oct. 12, 2012 for International Application No. PCT/US1248697.

PCT International Search Report and Written Opinion for International Application No. PCT/US 12/28008 dated May 22, 2012.

PCT International Search Report and Written Opinion for International Application No. PCT/US 12/28036 dated May 28, 2012.

PCT International Search Report and Written Opinion for International Application No. PCT/US2012/027912 dated Jun. 8, 2012.

PCT International Search Report and Written Opinion for International Application No. PCT/US 12/27892 dated Jun. 14, 2012.

M.J. Welch (2010), Addressing the Challenges in Underspecification in Web Search. (Order No. 3446833, University of California, Los Angeles). ProQuest Dissertations and Theses; 137; retrieved from http://search.proquest.com/docview/8581015007accountid=14753. (858101500).

K.J. Jeevan & P. Padhi (2006). A Selective Review of Research in Content Personalization. Library Review, 55(9), 556-586. doi:http:/dx.doi.org/10.1108/00242530610706761.

P.A. Lessner (2007). Chi-thinking: Chiasmus and Cognition. (Order No. 3297307, University of Maryland, College Park). ProQuest Disserations and Theses; 487; retrieved from http://search.proquest.com/docview/304851937?accountid=14753. (304851937).

International Preliminary Examination Report for International Application No. PCT/US12/27892 dated Sep. 10, 2013; 9 pages.

International Preliminary Examination Report for International Application No. PCT/US2012/027890 dated Sep. 10, 2013; 6 pages.

International Preliminary Examination Report for International Application No. PCT/US12/28036 dated Sep. 10, 2013; 5 pages.

International Preliminary Examination Report for International Application No. PCT/US12/28008 dated Sep. 10, 2013; 7 pages.

International Preliminary Examination Report for International Application No. PCT/US12/27912 dated Sep. 10, 2013; 6 pages.

PCT International Preliminary Report on Patentability (IPRP) for International Application No. PCT/US2012/048697 dated Feb. 4, 2014.

* cited by examiner

REAL-TIME VIDEO IMAGE ANALYSIS FOR PROVIDING SECURITY

CLAIM OF PRIORITY UNDER 35 U.S.C. §119

This Non-provisional patent application claims priority to U.S. Provisional Patent Application Ser. No. 61/450,213, filed Mar. 8, 2011, entitled "Real-Time Video Image Analysis Applications for Commerce Activity," and U.S. Provisional Patent Application Ser. No. 61/508,973 titled "Real-Time Video Image Analysis for Providing Security" filed on Jul. 18, 2011, assigned to the assignee hereof and hereby expressly incorporated by reference herein.

BACKGROUND

Home owners and the like have many options when it comes to protecting their homes and family. There are locks for doors and windows, security systems, fences, etc. Many companies specialize in providing security systems for the home. These systems provide piece of mind as well as protection for the home owner and his/her family. However, a level of home owner responsibility may come with these systems. For example, the home owner has to set the system every time he/she leaves the home. Once set, the home owner only has a few moments to get out of the home, or he/she will trigger the alarm. Furthermore, when going to bed the home owner may have to set the system as well. In this case, the home owner must not forget about setting the system when he/she wakes up, or he/she may also trigger the alarm. Therefore, these systems may not offer the security that may be required by the home owner because the systems may be inadvertently triggered or not activated at all.

Today, modern handheld mobile devices, such as smart phones or the like, have the capability to facilitate payment for a cup of coffee or provide a boarding pass for a flight. These advances combine multiple technologies through a handheld mobile device to provide a user with an array of capabilities. For example, many smart phones are equipped with significant processing power, sophisticated multi-tasking operating systems, and high-bandwidth Internet connection capabilities. Moreover, such mobile devices often have additional features that are becoming increasingly more common and standardized features. Such features include, but are not limited to, location-determining devices, such as Global Positioning System (GPS) devices; sensor devices, such as accelerometers; and high-resolution video cameras.

As the capabilities of such mobile devices have increased, so too have the applications (i.e., software) that can be used with the mobile devices. One such example of innovative software is a category known as augmented reality ("AR"), or more generally referred to as mediated reality. One such example of an AR presentment application platform is Layar, available from Layar, Amsterdam, the Netherlands. The Layar platform technology analyzes location data, compass direction data, and the like in combination with information related to the objects, locations or the like in a captured video stream to create browse-able "hot-spots" or "tags" that are superimposed on the mobile device display, resulting in an experience described as "reality browsing."

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for using real-time video analysis, such as AR or the like on a mobile device to provide security to the user of mobile device at anytime without having to activate a security system.

Using real-time video analysis, such as augmented reality or the like the user may capture information regarding a frequented area, such as the user's home, office, vehicle, person, relatives' homes, etc. The system reviews the captured information and stores the information in a memory device, such that the system a baseline layout of objects and individuals that may be located in the frequented area may be established. The baseline layout of objects and individuals of a frequented area may be determined by analysis of several factors. These factors aid in determining objects around the area and inside the area, such that variances between a captured image and a baseline layout may trigger an alert. An alert may be in the form of a text response, audio response, communication to authorities (police, fire, medical, and the like), communications to financial institutions (stop payment requests, etc.), communications to friends or family, visual response, etc. The factors include global position, compass position of mobile device capturing image or video, infrared data, facial recognition, radiation detection, heat sensors (including indications of stress levels), mobile device recognition, electro-thermal sensors, object recognition, dimensional data, movement recognition, time of day, and the like.

Based on these factors, the system may continually capture images of the frequented area such that changes from the baseline layout may be monitored. For example, if the user is sleeping in his/her bed the system, through the user's mobile device will continually capture images of the area around the mobile device. Therefore, if the user sets his mobile device on his/her night stand, the mobile device will continue to capture images of the bedroom, the interior of the home, and some portions of the exterior of the home. Therefore, if an intruder attempts to approach the home, the system may alert the user by providing an indicator as to where the system believes the intruder is. Furthermore, if the system recognizes an intruder in the home, the system will contact the appropriate authority directly.

In some embodiments, the system may provide indicators associated security compromises, such as an intruder. In other embodiments, the indicators may also provide indications associated with foreseen security issues within the frequented area. For example, the system may provide an indicator to the user that he/she forgot to lock the front door, a window, etc. In this way, the system may suggest locking the door and/or provide the user with a remote locking of the door, such that the user may select the indicator on his/her mobile device and remotely lock the door. In another example, the user may have placed a tall ladder on the side of his/her home where an intruder may be able to use the ladder to gain access to a second story of the home. In still other embodiments, the system may recognize individuals that frequent the user's frequented area, such as friends, family, etc. The system may determine those individual's normal moving patterns. Thus, if the individual falls or is hurt, the system may detect it and provide the user notice via an indicator.

In some embodiments, the user may select the indicator associated with the security compromise or the security issue. The system will then provide the user with more information about the security compromise or issue and potential remedies for that compromise or issue. For example, if the system provides an indicator associated with an intruder in the user's home office the system will, in some embodiments, automatically contact the police department. In other embodiments the indicator may allow the user to contact the police department be selecting the indicator. Furthermore, the indicator may direct the user to a financial institution that may provide instantaneous stop payment for all credit cards and add security to the other financial institution accounts.

Embodiments of the invention relate to systems, methods, and computer program products for providing security to a user, comprising: capturing, via a mobile device, a first image of an area frequented by the user; a directory of data relating to the area frequented by the user, wherein the directory comprises information regarding objects and individuals within the area frequented by the user, wherein the directory of data is built using the captured first image of the area frequented by the user; receiving, via a mobile device, a captured second image of the area frequented by the user subsequent to the directory of data being built; recognizing variations between the directory and the captured second images with respect to the objects and the individuals within the area frequented by the user, through the user of a processor device; and presenting indicators associated with the variations, via the mobile device of the user, a recommended security action based on the variations between the directory and the captured second image.

In some embodiments, presenting the indicators associated with the variations may comprise superimposing the indicators associated with the variations over real-time video that is capture by the mobile device of an area frequented by the user, wherein the location of the objects and the individuals within the area frequented by the user, other than the variations, correspond to the directory of data relating to the area frequented by the user.

In some embodiments, the directory may comprise information regarding the objects that are normally found within the area frequented by the user. The directory may also comprise information regarding the individuals that are normally found within the area frequented by the user.

In some embodiments, the captured second image of the area frequented by the user is captured using real-time imaging of the area frequented by the user. Furthermore, receiving the captured second image of the area frequented by the user may comprise receiving real-time images of the area frequented by the user continuously while the mobile device is in the area frequented by the user.

In some embodiments, presenting an indicator associated with the variation may comprise displaying the indicator on a display of the mobile device. Furthermore, presenting an indicator associated with the variation comprises superimposing the indicator over real-time video that is captured by the mobile device. The indicator is selectable by the user. Upon selection of the indicator the system may provide information regarding the variation based on security information related to the area frequented by the user.

BRIEF DESCRIPTION OF THE DRAWINGS

Figure 1:
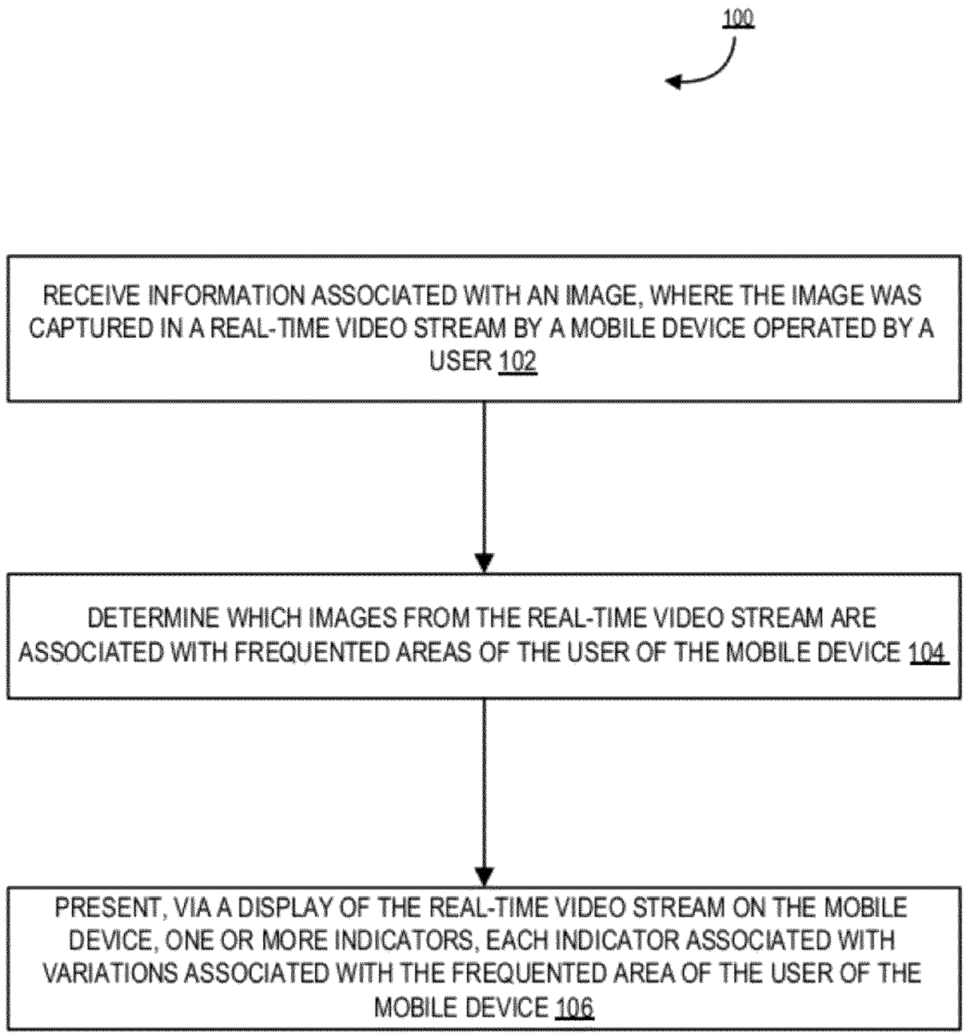
Figure 2:
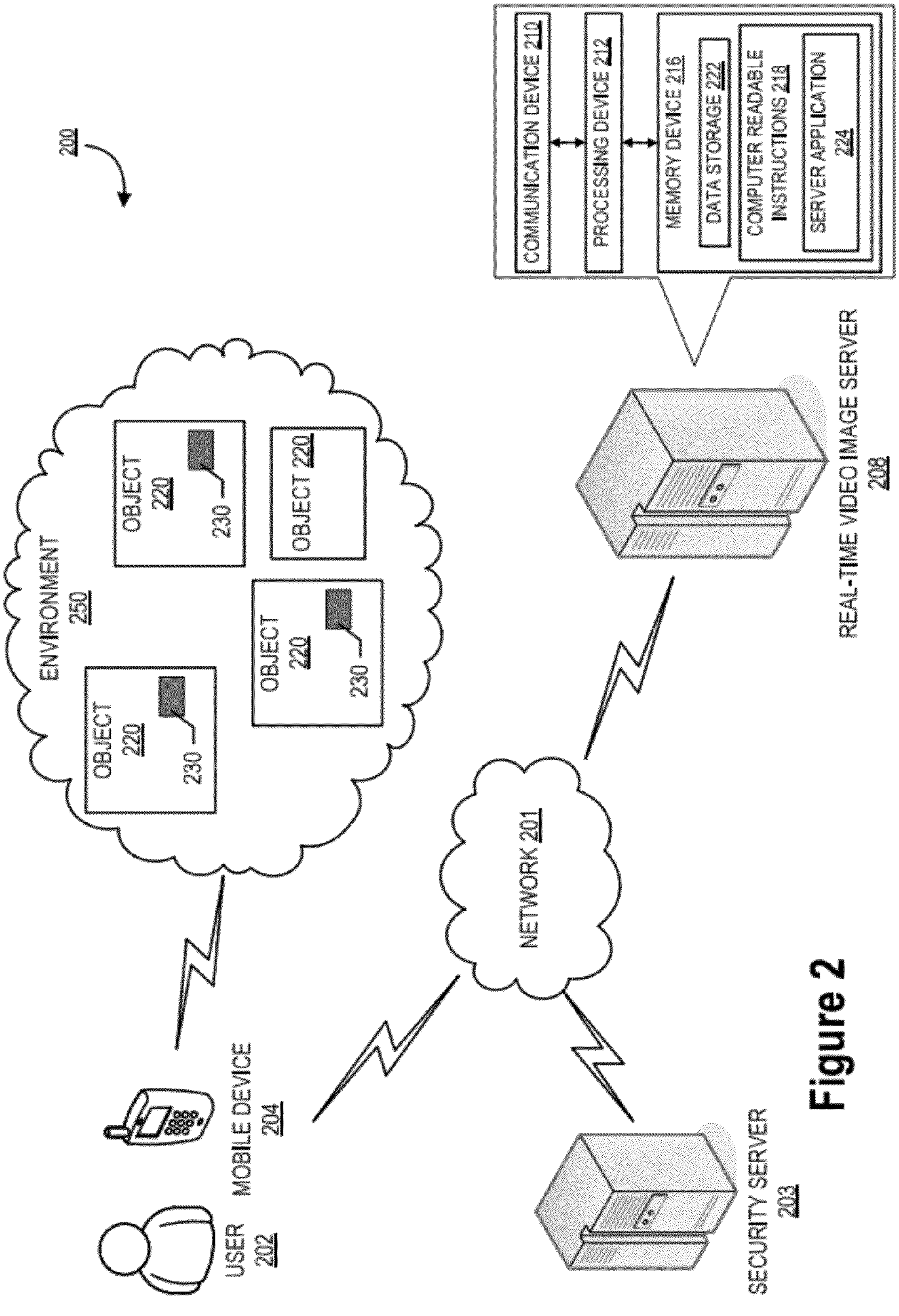
Figure 3:
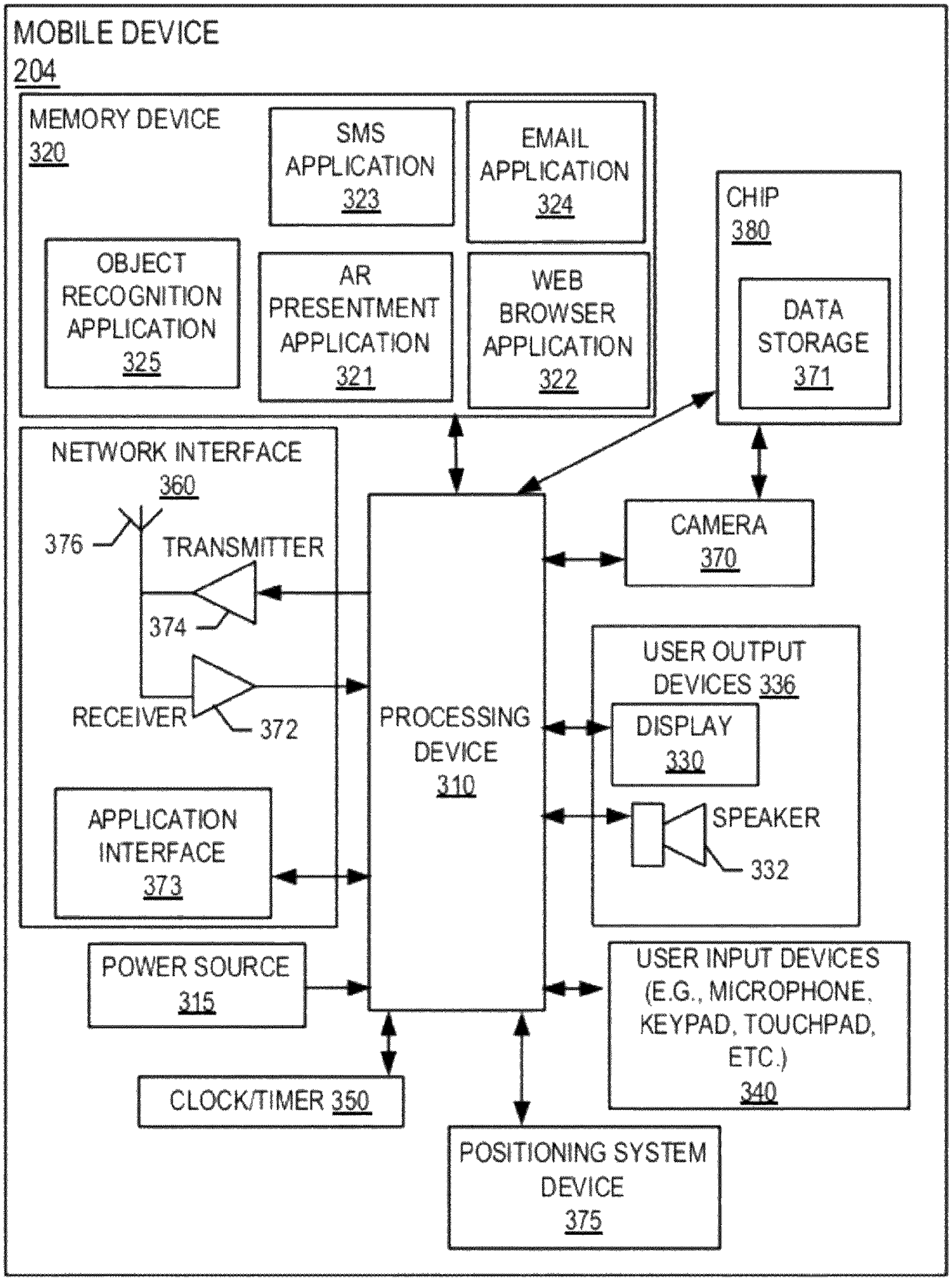
Figure 4:
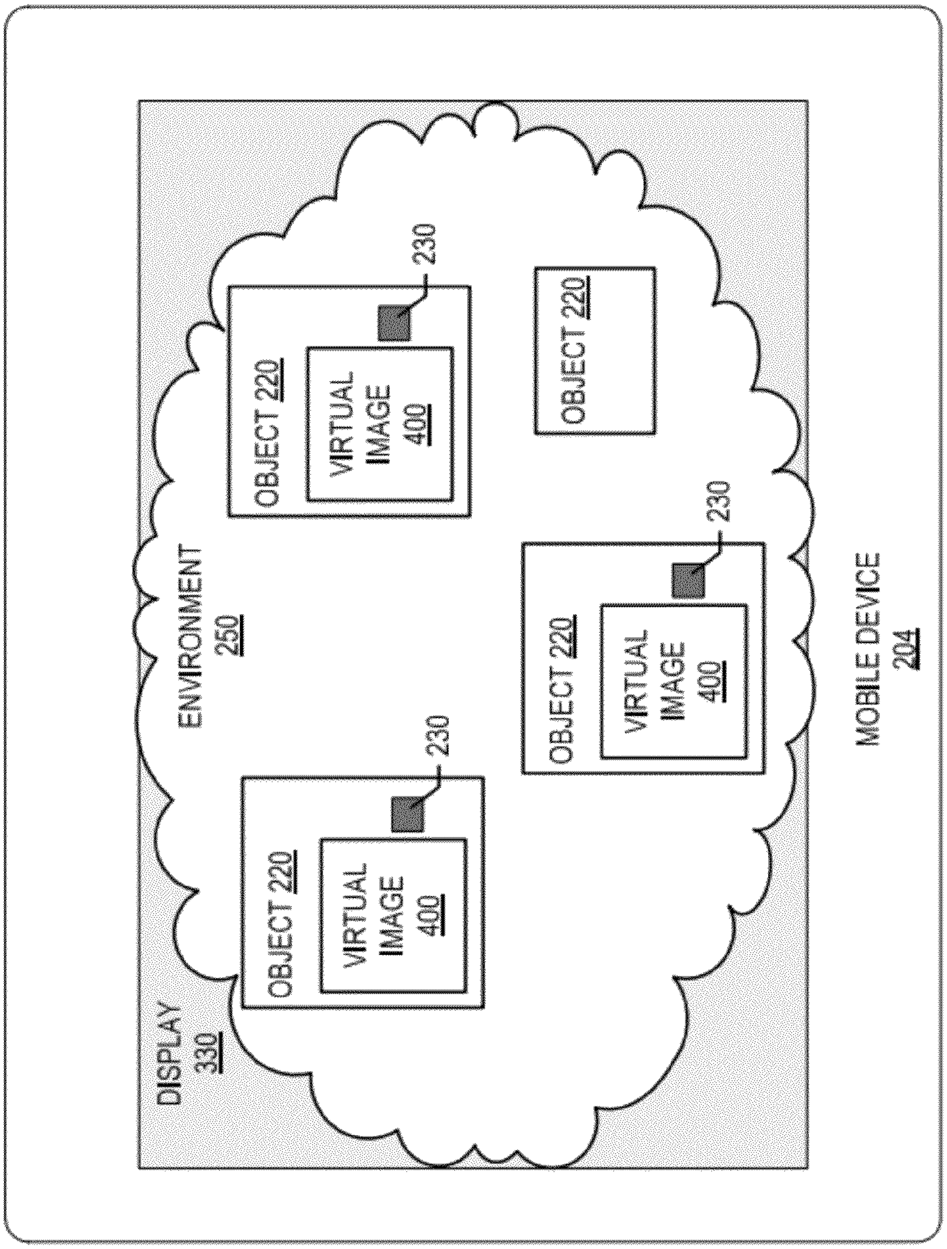
Figure 5:
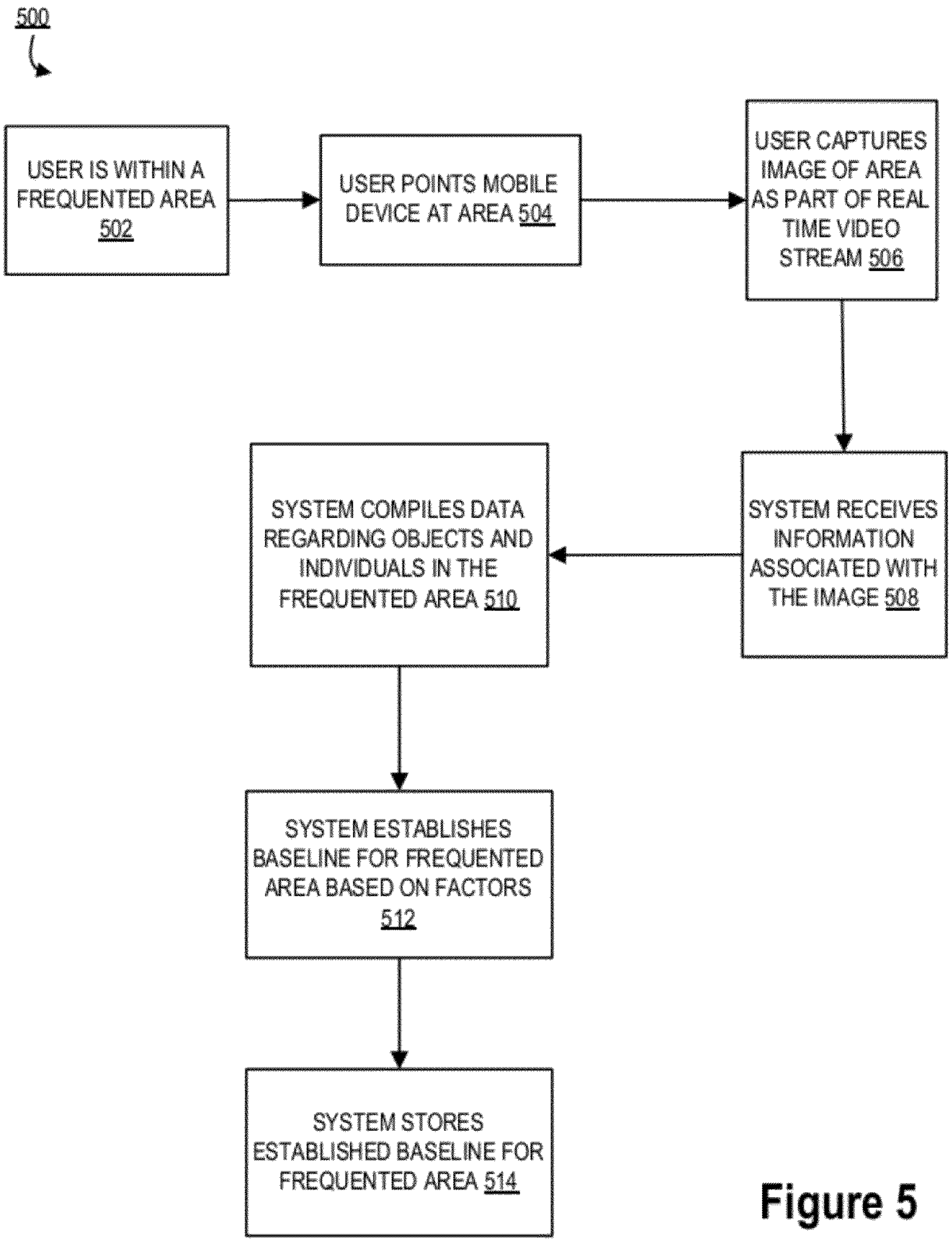
Figure 6:
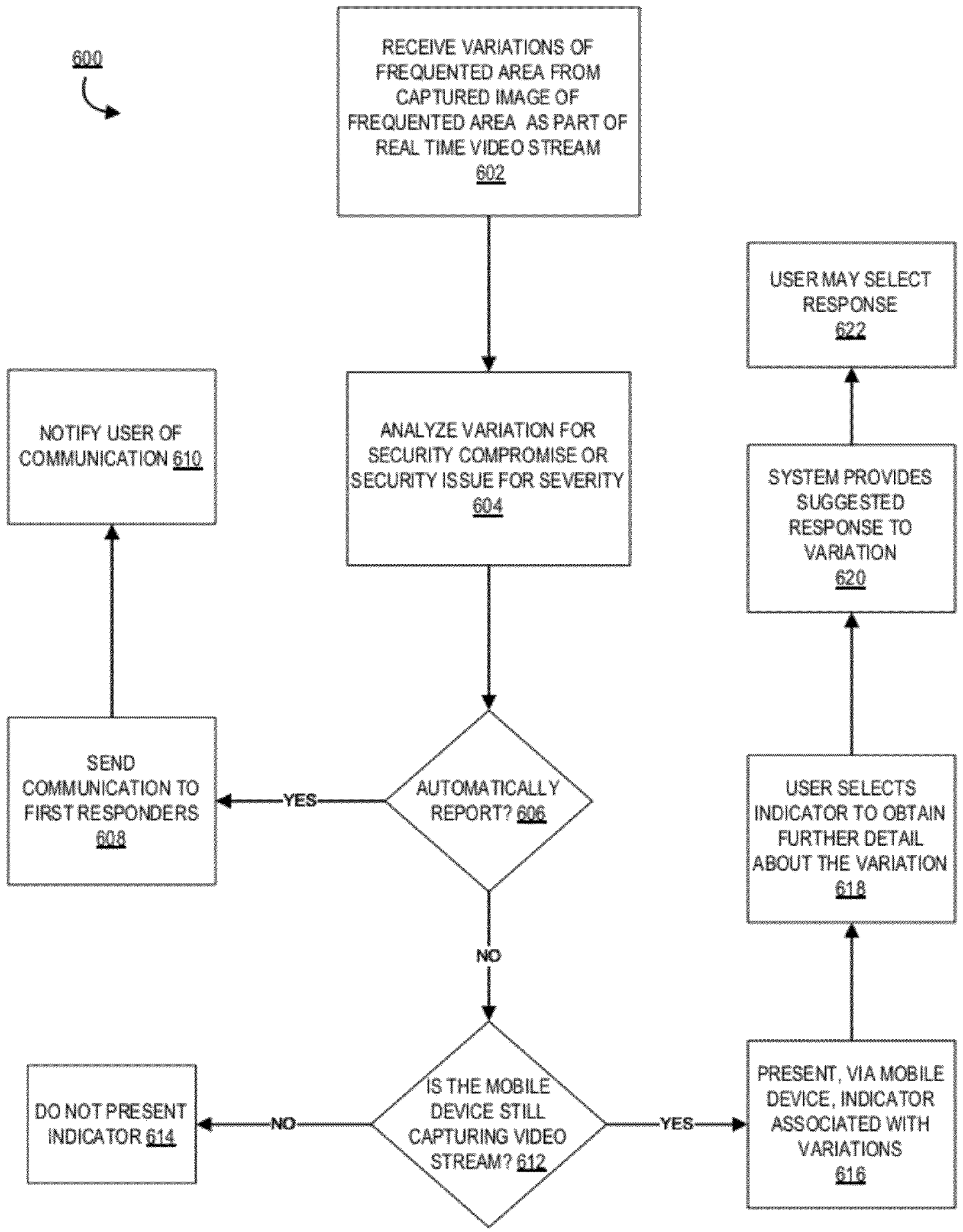

Having thus described embodiments of the invention in general terms, reference will now be made to the accompanying drawings, which are not necessarily drawn to scale, and wherein:

FIG. 1 provides a high level process flow illustrating a real-time security process, in accordance with one embodiment of the present invention;

FIG. 2 provides a security system environment, in accordance with an embodiment of the invention;

FIG. 3 provides a block diagram illustrating a mobile device, in accordance with an embodiment of the invention;

FIG. 4 provides an a representation illustrating a mobile device real-time video stream display environment, in accordance with an embodiment of the invention;

FIG. 5 provides a process map for providing security information, in accordance with an embodiment of the invention; and FIG. 6 provides a process map for providing security information, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

While embodiments discussed herein are generally described with respect to "real-time video streams" or "real-time video" it will be appreciated that the video stream may be captured and stored for later viewing and analysis. Indeed, in some embodiments, video is recorded and stored on a mobile device and portions or the entirety of the video may be analyzed at a later time. The later analysis may be conducted on the mobile device or loaded onto a different device for analysis. The portions of the video that may be stored and analyzed may range from a single frame of video (e.g., a screenshot) to the entirety of the video. Additionally, rather than video, the user may opt to take a still picture of the environment to be analyzed immediately or at a later time. Embodiments in which real-time video, recorded video or still pictures are analyzed are contemplated herein.

Some embodiments of the invention herein are generally described as involving "frequented areas." Frequented areas may include areas that are frequented by the user, such as, but not limited to the user's home, office, vehicle, relatives' homes, apartment, etc. Frequented areas may also include the user's person. For example, the system may recognize the location on the user that the user keeps his/her wallet, purse, and/or the like. In this way, the system may recognize and alert the user when he/she is missing his wallet or when it is in a different location than that determined by the baseline layout.

FIG. 1 illustrates a high level process flow of a real-time security process 100, which will be discussed in further detail throughout this specification with respect to FIGS. 2 through 6. The first step in the process 100 is to receive information associated with an image, where the image was captured by a mobile device using real-time video stream, the mobile device operated by a user, as illustrated by block 102. A real-time video stream may include images of frequented areas. For example, a user may move about his/her backyard while capturing a real-time video stream of the environment including the home, the exterior of the home, dimensions of the yard and home, and the like. In this way, after capturing one or more images of the home the system may create a baseline layout of the home for reference. In another embodiment of the invention, the system may compare images captured to a baseline layout previously determined to determine variations with respect to the objects and individuals within the area. In additional embodiments, the real-time video stream may be captured from a mobile device affixed to a moving vehicle, such as an automobile or the like, such that as the vehicle is driven, real-time video stream may be captured including images of the vehicle or of other frequented areas.

Next, in block 104 a determination is made as to which images from the real-time video stream are associated with frequented areas associated with the user of a mobile device. The determination is made by analyzing the real-time video stream to determine areas that the user has been to several times in the past. In this way, a the objects, individuals, logos, dimensions, compass information, and/or other frequented area-indicating features may be analyzed to determine what is within the video stream field and create a baseline based on the user visiting the area several times. In this way, the system may receive information about objects that may move to different locations within the area, such as clothing, dishes, etc. and recognize that these objects are "normal" and do not present a security issue or compromise. In this way, objects may move about a frequented area and the variations in the area may not be flagged if the movements are also recognized when establishing the baseline layout. The system may then provide indicators of security compromised or security issues associated with objects within the frequented area based on several factors. These factors include global position, compass position of mobile device capturing the image or video, infrared data, facial recognition, radiation detection, heat sensors (including indications of stress levels), mobile device recognition, electro-thermal sensors, object recognition, dimensional data, movement recognition, time of day, and the like.

Thereafter, at block 106 one or more indicators are presented on the display of the mobile device in conjunction with the real-time video stream. In some embodiments, the indicators are presented when the user captures a frequented area. Each of the indicators is associated with a variation of the image from the baseline layout as compared to the current image of the frequented area. The images associated with the frequented areas are matched with baseline objects and individuals of that frequented area, such that objects that are not recognized within the baseline are tagged with indicators as variations of the frequented area and possible security compromises or security issues. For example, if the user is in his/her home and also in the home is his/her family, dog, and an electrician working. The system may recognize that in that particular frequented area the user's family and dog are included as baseline objects or individuals. Therefore, the user's family and dog also frequent that user's frequented area. However, the system may provide an indicator associated with the location of the electrician. This is because the electrician may not be including in the baseline objects or individuals for that location, thus the electrician is a variation to the frequented area. Therefore, the user may select the indicator associated with the electrician and indicate to the system that the electrician is not a security compromise or security issue. Furthermore, the system may notice changes within the baseline objects or individuals. For example, a difference in an individual's normal walking pattern may indicate that the individual is hurt or has fallen. In this way, the system may recognize the accidental fall and report it to the user or the proper authorities.

The indicator may take various forms, such as display of a tag, a highlighted area, a hot-spot, or the like. In specific embodiments, the indicator is a selectable indicator, such that a user may select (e.g., click-on, hover-over, touch the display, provide a voice command, and/or the like) the object within the frequented area or indicator to provide display of specifics related to the object within the frequented area. In some embodiments, the indicator itself may provide the information or a portion of the information to the user. In addition, the information related to object within the frequented area or the frequented area itself may include a review of the object or area by the system.

FIG. 2 provides a security information system environment 200, in accordance with one embodiment of the present invention. As illustrated in FIG. 2, the real-time video image server 208 is operatively coupled, via a network 201 to the mobile device 204 and the security system server 203. In this way, the real-time video image server 208 can send information to and receive information from the mobile device 204 and the security system server 203. The information sent to and received from the mobile device 204 allows the system to associate indicators within the real-time video stream to indicate security compromises or security issues within the frequented area of the user. The information sent to and received from the security system server 203 allows for notification and conformation of security breaches with respect to indicators associated with the real-time video stream. FIG. 2 illustrates only one example of an embodiment of a security information system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

In some embodiments, the user 202 is an individual. The user 202 may be any individual wishing to use real-time video analysis for security. The security functions may be directed to frequented areas, such as, but not limited to the individual's person, home, family, friends, relatives' homes, apartment, office, and/or the like.

The user 202 may be in range of any frequented area for which the user 202 may wish to consider implementing using the real-time video system. In some embodiments, the user 202 may have to activate the system, such that the system will receive images from the mobile device. At this point, the system may determine if the area is a frequented area. In some embodiments, the system will automatically be activated, such that the mobile device will continuously send images to the system without requiring action from the user 202. At this point, the system will automatically determine and locate frequent areas when the user 202 approaches a frequented area with his/her mobile device. For example, the system will know when the mobile device is on the user's 202 person because the captured image will be the user's pocket. In another example, the system may recognize with the user 202 is in his/her vehicle or at his/her home without the user 202 having to activate the system. In this way, the system may provide the user 202 with security information, specifically indications as to security compromises and security issues at all times the user 202 has his/her mobile device 204 with him/her and in the on position.

As illustrated in FIG. 2, the real-time video image server 208 generally comprises a communication device 210, a processing device 212, and a memory device 216. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 212 is operatively coupled to the communication device 210 and the memory device 216. The processing device 212 uses the communication device 210 to communicate with the network 201 and other devices on the network 201, such as, but not limited to the mobile device 204 and the security system server 203. As such, the communication device 210 generally comprises a modem, server, or other device for communicating with other devices on the network 201.

In some embodiments, the processing device 212 may also be capable of operating one or more applications, such as one or more applications functioning as an artificial intelligence ("AI") engine. The processing device 212 may recognize frequented areas or objects it has identified in prior uses by way of the AI engine. In this way, the processing device 212 may recognize objects within a frequented area and store information related to the recognized objects in one or more memories and/or databases discussed herein. Once the AI engine has thereby "learned" of an object and/or frequented area, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module of the mobile device and/or server, an indication that particular object being a part of a specific frequented area. For example, a dog may be captured via real-time video stream and the AI engine may recognize that the dog captured is the user's 202 dog and may further realize that the dog is typically located in the frequented area of the user's 202 home. In this regard, the AI engine may provide a starting point from which to determine the frequented that the user 202 may be located. In other embodiments, the AI engine's recognition of an object and/or frequented area is accepted as the final recognition of the object or area.

As further illustrated in FIG. 2, the real-time video image server 208 comprises computer-readable instructions 218 stored in the memory device 216, which in one embodiment includes the computer-readable instructions 218 of a server application 224. In some embodiments, the memory device 216 includes data storage 222 for storing data related to security information including but not limited to data created and/or used by the server application 224 or a directory created by the user 202.

In the embodiment illustrated in FIG. 2 and described throughout much of this specification, the server application 224 may analyze frequented areas captured by a user 202 using a real-time video stream. The server application 224 analyzes factors associated with the frequented area to provide a baseline layout for the area and to determine variances in the baseline. The factors the server application 224 analyzes includes, but is not limited to global position, compass position of mobile device capturing image or video, infrared data, facial recognition, radiation detection, heat sensors (including indications of stress levels), mobile device recognition, electro-thermal sensors, object recognition, dimensional data, movement recognition, time of day, and the like.

Once the server application 224 analyzes the frequented area of the user 202, the server application 224 provides the user 202 a virtual frequented area incorporating baseline layouts and individuals. The baseline layout provides the system with a baseline for future capturing of the frequented area, such that variances within the area may be recognized. For example, if facial recognition determines an individual or animal in the frequented area during the baseline layout, then during subsequent capturing of that frequented area, a different individual is determined by facial recognition, then the system will recognize that variation.

In some embodiments, the server application 224 may further determine if the variation reaches the level of a security compromise or security issue. A security compromise comprises a breach within the frequented area. In some embodiments, a breach may include an identification of an individual, such as an intruder, within the frequented area. In other embodiments, a breach may include a broken window, door, pocket, or the like that may be an indication as to an individual within the frequented area without the user 202 providing the individual an invitation. A security issue is an issue with the frequented area that may arise to an easy security compromise by an intruder. For example, a security issue may be unlocked doors, open door, open garage door, unlocked windows, open windows. Security issues may also include items that the user 202 has left around the frequented area, such as, but not limited to ladders, shovels, hammers, etc. that are easily retrievable by the intruder. In this way, the system may provide the user 202 with recommendations as to the safest way to eliminate security issues. Security issues may also be issues that the system recognizes that may prevent fires. For example, the system may recognize that a smoke detector in a home has a low battery.

In some embodiments, the server application 224 may further provide aid to the user 202 upon a security compromise or issue occurring. For example, if the system recognizes an intruder in the user's 202 home the system may contact the authorities. In another example, if the system determines that an intruder has already broken into the user's 202 home, the system may contact the authorities and the user's 202 insurance. The system may further determine what items where stolen, if any, by the intruder and provide that information to the authorities and the insurance. Furthermore, the server application 224 may recognize if financial information has been seen or stolen by an intruder. In this way, the system may automatically send a communication to the financial institution to initiate a freeze on all of the accounts that the intruder may have stolen.

The data stored within the server application 224 provides computer readable instructions 218 to the processing device 212 to allow for system to determine variations within the frequented area, such that the system may recognize possible security compromises or security issues. The server application 224 stores the data regarding the frequented area, such as the layout baseline, individuals, and other aspects of the area determined by the factors, so that the server application 224 may compare the baseline for that frequented area with any subsequent capturing of that area using real-time images.

In some embodiments, as described in further detail below, the server application 224 may recognize a marker 230 and/or objects 220 within an environment 250. The marker 230 may be interpreted with respect to data in the memory device 216 and be recognized as a possible variation within the frequented area of the user 202. In this way, the real-time video image server 208 provides marker 230 interpretations and analysis with respect to the data and baseline layout of the frequented area on the real-time video image server 208.

In some embodiments, the server application 224 may analyze the real-time video stream at all times, while the mobile device 204 is in the on position. In this way, the system may monitor the frequented area it receives the image from at all times throughout the day. If the user 202 is walking down the street and his/her mobile device 204 is in his/her pocket. The system will recognized the mobile device 204 in the user's 202 pocket as a frequented area. Therefore, if a variation with respect to the objects in the frequented area (or user's 202 person) occurs, the user 202 may receive notice of that change. For example, if the user 202 typically wears a necklace, the necklace is included in the baseline layout. Therefore, if the system receives a captured image of the user 202 and the system, through use of one of the factors, recognizes that the user 202 does not have on the necklace, the system may notify the user 202. In another embodiment, the system may recognize that the user 202 always has a wallet in his/her back right pocket. If a wallet is not recognized by the system, the system may alert the user 202 of the fact that there is no wallet in his/her back right pocket. Furthermore, if the system is analyzing the real-time video stream at all times, the system will determine changes within the frequented area during the passing of time. For example, the system may recognize a wallet in the back pocket of the user 202, then recognize that the wallet is no longer there. But instead of immediately notifying the user 202, the system may wait to determine if the user 202 took the wallet out of his/her pocket to make a purchase or the like. However, if the wallet is not returned or the factors indicate that the user 202 is not located near a purchase location, but instead in a high-crime area, the system may alert the user 202.

An alert may include a notification sent to the user's 202 mobile device 204, a friend or family member's telephone or mobile device, authority such as police, fire, and/or the like. A notification may be in the form of a voice notification, text message, sound notification, etc.

The server application 224 may also provide indicators to the user 202 associated with variations in a frequented area. These indicators, explained in further detail below, are associated with the variation and, upon selection, may provide system recommendations regarding the variation. For example, if the system recognizes that a door in a home is unlocked, the system will provide an indicator associated with that door on the display of the mobile device 204. Upon selection of the indicator, the user 202 may receive an update as to why the door hand an indicator or a recommendation. For example, the system may providing and indicator and update the user 202 that the door is unlocked and that is why an indicator is associated with the door. Furthermore, the system may recommend that the user 202 lock the door.

As further illustrated is FIG. 2, an environment 250 in which the user 202 utilizes a mobile device 204 to capture real-time video of an environment 250 in an augmented reality experience. As described in further detail below with respect to FIG. 3, the mobile device 204 may be any mobile communication device. The mobile device 204 has the capability of capturing real-time video of the surrounding environment 250. The real-time video capture may be by any means known in the art. In one particular embodiment, the mobile device 204 is a mobile telephone equipped with a camera capable of video capture.

The environment 250 contains a number of objects 220. Objects 220 include, but are not limited to a frequented area, objects in the frequented area, and/or the like that the user 202 may wish to utilize the system for. Some of such objects 220 may include an marker 230 identifiable to the mobile device 204, if the object is a variation from the baseline layout of the frequented area. A marker 230 may be any type of marker that is a distinguishing feature that can be interpreted to identify specific objects 220. In some embodiments, the marker 230 may be interpreted by the mobile device 204. In other embodiments, the marker 230 may be interpreted by the real-time video image server 208. In yet other embodiments, the marker 230 may be interpreted by both the mobile device 204 and the real-time video image server 208. For instance, a marker may be alpha-numeric characters, symbols, logos, shapes, ratio of size of one feature to another feature, a product identifying code such as a bar code, electromagnetic radiation such as radio waves (e.g., radio frequency identification (RFID)), architectural features, color, etc. In some embodiments, the marker 230 may be audio and the mobile device 204 may be capable of utilizing audio recognition to identify words or unique sounds broadcast. The marker 230 may be any size, shape, etc. Indeed, in some embodiments, the marker 230 may be very small relative to the object 220 such as the alpha-numeric characters that identify the name or model of an object 220, whereas, in other embodiments, the marker 230 is the entire object 220 such as the unique shape, size, structure, etc.

In some embodiments, the marker 230 is not actually a physical marker located on or being broadcast by the object 220. For instance, the marker 230 may be some type of identifiable feature that is an indication that the object 220 is nearby. In some embodiments, the marker 230 for an object 220 may actually be the marker 230 for a different object 220. For example, the mobile device 204 may recognize a particular building as being "Building A." Data stored in the data storage 371 may indicate that "Building B" is located directly to the east and next to "Building A." Thus, marker 230 for an object 220 that are not located on or being broadcast by the object 220 are generally based on fixed facts about the object 220 (e.g., "Building B" is next to "Building A"). However, it is not a requirement that such a marker 230 be such a fixed fact. The marker 230 may be anything that enables the mobile device 204 and/or the financial institution application 224 to interpret to a desired confidence level what the object is. For example, the mobile device 204, object recognition application 325 and/or AR presentation application 321 may be used to identify a particular person as a first character from a popular show, and thereafter utilize the information that the first character is nearby features of other characters to interpret that a second character, a third character, etc. are nearby, whereas without the identification of the first character, the features of the second and third characters may not have been used to identify the second and third characters. This example may also be applied to objects outside of people.

The marker 230 may also be, or include, social network data, such as data retrieved or communicated from the Internet, such as tweets, blog posts, social networking site posts, various types of messages and/or the like. In other embodiments, the marker 230 is provided in addition to social network data as mentioned above. For example, mobile device 204 may capture a video stream and/or one or more still shots of a large gathering of people. In this example, as above, one or more people dressed as characters in costumes may be present at a specified location. The mobile device 204, object recognition application 325, and/or the AR presentation application 321 may identify several social network indicators, such as posts, blogs, tweets, messages, and/or the like indicating the presence of one or more of the characters at the specified location. In this way, the mobile device 204 and associated applications may communicate information regarding the social media communications to the user and/or use the information regarding the social media communications in conjunction with other methods of object recognition. For example, the mobile device 204 object recognition application 325, and/or the AR presentation application 321 performing recognition of the characters at the specified location may confirm that the characters being identified are in fact the correct characters based on the retrieved social media communications. This example may also be applied objects outside of people.

In some embodiments, the mobile device 204 and/or server accesses one or more other servers, social media networks, applications, and/or the like in order to retrieve and/or search for information useful in performing an object recognition. In some embodiments, the mobile device 204 and/or server accesses another application by way of an application programming interface or API. In this regard, the mobile device 204 and/or server may quickly search and/or retrieve information from the other program without requiring additional authentication steps or other gateway steps.

In some embodiments, markers 230 may be recognized by the server application 224. For example, the server application 224 may identify a marker 230 as being a variation in the frequented area, the server application 224 may then provide real-time data indicating whether the variation is a potential security issue or security compromise. For example, the marker 230 may identify an electrician in the frequented area; the system may determine that that new variation to the frequented area is not a security issue or security compromise.

While FIG. 2 illustrates that the objects 220 with markers 230 only include a single marker 230, it will be appreciated that the object 220 may have any number of markers 230 with each equally capable of identifying the object 220. Similarly, multiple markers 230 may be identified by the mobile device 204 such that the combination of the markers 230 may be utilized to identify the object 220. For example, the facial recognition may identify a person as a famous athlete, and thereafter utilize the uniform the person is wearing to confirm that it is in fact the famous athlete.

In some embodiments, a marker 230 may be the location of the object 220. In such embodiments, the mobile device 204 may utilize GPS software to determine the location of the user 202. As noted above, a location-based marker 230 could be utilized in conjunction with other non-location-based markers 230 identifiable and recognized by the mobile device 204 to identify the object 220. However, in some embodiments, a location-based marker 230 may be the only marker 230. For instance, in such embodiments, the mobile device 204 may utilize GPS software to determine the location of the user 202 and a compass device or software to determine what direction the mobile device 204 is facing in order to identify the object 220. In still further embodiments, the mobile device 204 does not utilize any GPS data in the identification. In such embodiments, markers 230 utilized to identify the object 220 are not location-based.

As further illustrated is FIG. 2, a security system server 203 is operatively coupled to the real-time video image server 208 and the mobile device 204. The security system server 203 has systems with devices the same or similar to the devices described for the real-time video image server (i.e., communication device, processing device, and memory device). Therefore, the security system server 203 communicates with the real-time video image server 208 and the mobile device 204 in the same or similar way as previously described with respect to each system. In some embodiments, the security system sever 203 may already provide the user 202 a home security system for his/her home, vehicle, office, etc. In this way, the server application 224 may be linked to the user's 202 current home security system, thus providing correlating security. For example, the system may provide the user 202 information updating his/her home security system, reminding him/her to activate the home security system (which may be done remotely, via the mobile device 204), or the like. The security system server 203, in some embodiments, may be accessed by the real-time video image server 208, so that the real-time video image server 208 may determine and/or predict the likelihood of a security issue or security compromise. Furthermore, the security system server 203 allows for contact to security system providers and the like, such that the real-time video image server 208 may be aware of the potential that a specific variation may cause a security issue or security compromise.

FIG. 3 illustrates an embodiment of a mobile device 204 that may be configured to execute augmented reality functionality. A "mobile device" 204 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, tablets, radio, GPS devices, any combination of the aforementioned, or the like.

The mobile device 204 may generally include a processing device 310 communicably coupled to such devices as a memory device 320, user output devices 336, user input devices 340, a network interface 360, a power source 315, a clock or other timer 350, a camera 370, a positioning system device 375, one or more chips 380, etc.

In some embodiments, the mobile device 204 and/or the server access one or more databases or datastores (not shown) to search for and/or retrieve information related to the object and/or marker. In some embodiments, the mobile device 204 and/or the server access one or more datastores local to the mobile device 204 and/or server and in other embodiments, the mobile device 204 and/or server access datastores remote to the mobile device and/or server. In some embodiments, the mobile device 204 and/or server access both a memory and/or datastore local to the mobile device 204 and/or server as well as a datastore remote from the mobile device 204 and/or server The processing device 310 may include functionality to operate one or more software programs or applications, which may be stored in the memory device 320. For example, the processing device 310 may be capable of operating a connectivity program, such as a web browser application 322. The web browser application 322 may then allow the mobile device 204 to transmit and receive web content, such as, for example, location-based content and/or other web page content, according to a Wireless Application Protocol (WAP), Hypertext Transfer Protocol (HTTP), and/or the like.

The processing device 310 may also be capable of operating applications, such as an object recognition application 325 and/or an AR presentment application 321. The object recognition application 325 and/or the AR presentment application 321 may be downloaded from a server and stored in the memory device 320 of the mobile device 204. Alternatively, the object recognition application 325 and/or the AR presentment application 321 may be pre-installed and stored in a memory in the chip 380. In such an embodiment, the user may not need to download the object recognition application 325 and/or the AR presentment application 321 from a server. In this way the object recognition application 325 and/or the AR presentment application 321 may remain at the server, such as the real-time video image server 208, within the server application 224.

The object recognition application 325 provides the mobile device 204 with object recognition capabilities. In this way, objects 220 such as products and/or the like may be recognized by the object 220 itself and/or markers 230 associated with the objects 220. This is described in further detail below with respect to FIG. 4. In this way the object recognition application 325 may communicate with other devices on the network 201 to determine the object 220 within the real-time video stream.

The AR presentment application 321 provides the mobile device 204 with AR capabilities. In this way, the AR presentment application 321 may provide superimposed indicators related to the object 220 in the real-time video stream, such that the user 202 may have access to the targeted offers by selecting an indicator superimposed on the real-time video stream. The AR presentment application 321 may communicate with the other devices on the network 201 to provide the user 202 with indications associated with targeted offers for objects 202 in the real-time video display. The presentation and selection of indicators provided to the user 202 via the AR presentment application 321 is described in further detail below with respect to FIG. 5.

The chip 380 may include the necessary circuitry to provide the object recognition and/or the AR functionality to the mobile device 204. Generally, the chip 380 will include data storage 371 which may include data associated with the objects within a real-time video stream that the object recognition application 325 identifies as having a certain marker(s). The chip 380 and/or data storage 371 may be an integrated circuit, a microprocessor, a system-on-a-chip, a microcontroller, or the like. As discussed above, in one embodiment, the chip 380 may provide the object recognition and/or the AR functionality to the mobile device 204.

Of note, while FIG. 3 illustrates the chip 380 as a separate and distinct element within the mobile device 204, it will be apparent to those skilled in the art that the chip 380 functionality may be incorporated within other elements in the mobile device 204. For instance, the functionality of the chip 380 may be incorporated within the memory device 320 and/or the processing device 310. In a particular embodiment, the functionality of the chip 380 is incorporated in an element within the mobile device 204 that provides object recognition and/or AR capabilities to the mobile device 204. Still further, the chip 380 functionality may be included in a removable storage device such as an SD card or the like.

The processing device 310 may be configured to use the network interface 360 to communicate with one or more other devices on a network 201 such as, but not limited to the real-time video image server 208. In this regard, the network interface 360 may include an antenna 376 operatively coupled to a transmitter 374 and a receiver 372 (together a "transceiver"). The processing device 310 may be configured to provide signals to and receive signals from the transmitter 374 and receiver 372, respectively. The signals may include signaling information in accordance with the air interface standard of the applicable cellular system of the wireless telephone network that may be part of the network 201. In this regard, the mobile device 204 may be configured to operate with one or more air interface standards, communication protocols, modulation types, and access types. By way of illustration, the mobile device 204 may be configured to operate in accordance with any of a number of first, second, third, and/or fourth-generation communication protocols and/or the like. For example, the mobile device 204 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 204 may also be configured to operate in accordance with non-cellular communication mechanisms, such as via a wireless local area network (WLAN) or other communication/data networks.

The network interface 360 may also include an application interface 373 in order to allow a user to execute some or all of the above-described processes with respect to the object recognition application 325, the AR presentment application 321, and/or the chip 380. In some embodiments, the application interface 373 may further execute some or all of the above-described processes with respect to the server application 224. The application interface 373 may have access to the hardware, e.g., the transceiver, and software previously described with respect to the network interface 360. Furthermore, the application interface 373 may have the ability to connect to and communicate with an external data storage on a separate system within the network 201. In some embodiments, the external data is stored in the memory device 216 of the real-time video image server 208.

As described above, the mobile device 204 may have a user interface that includes user output devices 336 and/or user input devices 340. The user output devices 336 may include a display 330 (e.g., a liquid crystal display (LCD) or the like) and a speaker 332 or other audio device, which are operatively coupled to the processing device 310. The user input devices 340, which may allow the mobile device 204 to receive data from a user 202, may include any of a number of devices allowing the mobile device 204 to receive data from a user 202, such as a keypad, keyboard, touch-screen, touchpad, microphone, mouse, joystick, other pointer device, button, soft key, and/or other input device(s).

The mobile device 204 may further include a power source 315. Generally, the power source 315 is a device that supplies electrical energy to an electrical load. In some embodiment, power source 315 may convert a form of energy such as solar energy, chemical energy, mechanical energy, etc. to electrical energy. Generally, the power source 315 in a mobile device 204 may be a battery, such as a lithium battery, a nickel-metal hydride battery, or the like, that is used for powering various circuits (e.g., the transceiver circuit, and other devices that are used to operate the mobile device 204). Alternatively, the power source 315 may be a power adapter that can connect a power supply from a power outlet to the mobile device 204. In such embodiments, a power adapter may be classified as a power source "in" the mobile device 204.

The mobile device 204 may also include a memory device 320 operatively coupled to the processing device 310. As used herein, memory may include any computer readable medium configured to store data, code, or other information. The memory device 320 may include volatile memory, such as volatile Random Access Memory (RAM) including a cache area for the temporary storage of data. The memory device

320 may also include non-volatile memory, which can be embedded and/or may be removable. The non-volatile memory may additionally or alternatively include an electrically erasable programmable read-only memory (EEPROM), flash memory or the like.

The memory device 320 may store any of a number of applications or programs which comprise computer-executable instructions/code executed by the processing device 310 to implement the functions of the mobile device 204 described herein. For example, the memory device 320 may include such applications as an object recognition application 325, an AR presentment application 321, a web browser application 322, an SMS application 323, an email application 324, etc.

FIG. 4 further illustrates a mobile device 204 wherein the user 202 has executed an object recognition application 325, an AR presentment application 321, and a real-time video capture device (e.g., camera 370) is utilized to display the surrounding environment 250 on the display 330 of the mobile device 204. In some embodiments, the object recognition application 325 is configured to utilize markers 230 to identify objects 220, such as objects in the frequented area that provide the baseline layout or variations to the frequented area, and indicate to the user 202 identified objects 220 by displaying a virtual image 400 on the mobile device display 330. As illustrated in FIG. 4, if an object 220 does not have any markers 230 (or at least enough markers 230 to yield object identification), the object recognition application 325 may allow the object 220 to be displayed without an associated virtual image 400.

The object recognition application 325 may use any type of means in order to identify desired objects 220. For instance, the object recognition application 325 may utilize one or more pattern recognition algorithms to analyze objects in the environment 250 and compare with markers 230 in data storage 371 which may be contained within the mobile device 204 (such as within chip 380) or externally on a separate system accessible via the connected network 201, such as but not limited to the real-time video image server 208. For example, the pattern recognition algorithms may include decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels such as Bayesian networks and Markov random fields, ensemble learning algorithms such as bootstrap aggregating, boosting, ensemble averaging, combinations thereof, and the like.

Upon identifying an object 220 within the real-time video stream, the AR presentment application 321 is configured to superimpose a virtual image 400 on the mobile device display 330. The virtual image 400 is generally a tab or link displayed such that the user 202 may "select" the virtual image 400 and retrieve information related to the identified object. The information may include any desired information associated with the selected object and may range from basic information to greatly detailed information. In some embodiments, the virtual image 400 may provide the user 202 with an internet hyperlink to further information on the object 220. The information may include, for example, all types of media, such as text, images, clipart, video clips, movies, or any other type of information desired. In yet other embodiments, the virtual image 400 information related to the identified object may be visualized by the user 204 without "selecting" the virtual image 400.

In embodiments in which the virtual image 400 provided by the AR presentment application 321, provides an interactive tab to the user 202, the user 202 may select the virtual image 400 by any conventional means for interaction with the mobile device 204. For instance, in some embodiments, the user 202 may utilize an input device 340 such as a keyboard to highlight and select the virtual image 400 in order to retrieve the information. In a particular embodiment, the mobile device display 330 includes a touch screen that the user may employ to select the virtual image 400 utilizing the user's finger, a stylus, or the like.

In some embodiments, the virtual image 400 is not interactive and simply provides information to the user 202 by superimposing the virtual image 400 onto the display 330. For example, in some instances it may be beneficial for the object recognition application 325 and/or the AR presentment application 321 to merely identify an object 220, just identify the object's name/title, give brief information about the object, etc., rather than provide extensive detail that requires interaction with the virtual image 400. The mobile device 204 is capable of being tailored to a user's 202 desired preferences.

Furthermore, the virtual image 400 may be displayed at any size on the mobile device display 330. The virtual image 400 may be small enough that it is positioned on or next to the object 220 being identified such that the object 220 remains discernible behind the virtual image 400. Additionally, the virtual image 400 may be semi-transparent such that the object 220 remains discernible behind the virtual image. In other embodiments, the virtual image 400 may be large enough to completely cover the object 220 portrayed on the display 330. Indeed, in some embodiments, the virtual image 400 may cover a majority or the entirety of the mobile device display 330.

The user 202 may opt to execute the object recognition application 325 and/or the AR presentment application 321 at any desired moment and begin video capture and analysis. However, in some embodiments, the AR presentment application 321 includes an "always on" feature in which the mobile device 204 is continuously capturing video and analyzing the objects 220 within the video stream. In such embodiments, the object recognition application 325 may be configured to alert the user 202 that a particular object 220 has been identified. The user 202 may set any number of user preferences to tailor the AR experience to his needs. For instance, the user 202 may opt to only be alerted if a certain particular object 220 is identified. Additionally, it will be appreciated that the "always on" feature in which video is continuously captured may consume the mobile device power source 315 more quickly. Thus, in some embodiments, the "always on" feature may disengage if a determined event occurs such as low power source 315 or if the user 202 sets a certain time of day to disengage, etc. Conversely, if the "always on" feature is disengaged due to the occurrence of such an event, the user 202 may opt for the "always on" feature to re-engage after the duration of the disengaging event (e.g., power source 315 is re-charged, etc.).

In some embodiments, the user 202 may identify objects 220 that the object recognition application 325 does not identify and add it to the data storage 371 with desired information in order to be identified and/or displayed in the future. For instance, the user 202 may select an unidentified object 220 and enter a name/title and/or any other desired information for the unidentified object 220. In such embodiments, the object recognition application 325 may detect/record certain markers 230 about the object so that the pattern recognition algorithm(s) (or other identification means) may detect the object 220 in the future. Furthermore, in cases where the object information is within the data storage 371, but the object recognition application 325 fails to identify the object 220 (e.g., one or more identifying characteristics or markers 230 of the object has changed since it was added to the data storage 371 or the marker 230 simply was not identified), the user 202 may select the object 220 and associate it with an object 220 already stored in the data storage 371. In such cases, the object recognition application 325 may be capable of updating the markers 230 for the object 220 in order to identify the object in future real-time video streams.

In addition, in some embodiments, the user 202 may opt to edit the information or add to the information provided by the virtual object 400. For instance, the user 202 may opt to include user-specific information about a certain object 220 such that the information may be displayed upon a future identification of the object 220. Conversely, in some embodiments, the user 202 may opt to delete or hide an object 220 from being identified and a virtual object 400 associated therewith being displayed on the mobile device display 330.

Furthermore, in some instances, an object 220 may include one or more markers 230 identified by the object recognition application 325 that leads the object recognition application 325 to associate an object with more than one object in the data storage 371. In such instances, the user 202 may be presented with the multiple candidate identifications and may opt to choose the appropriate identification or input a different identification. The multiple candidates may be presented to the user 202 by any means. For instance, in one embodiment, the candidates are presented to the user 202 as a list wherein the "strongest" candidate is listed first based on reliability of the identification. Upon input by the user 202 identifying the object 220, the object recognition application 325 and/or the AR presentment application 321 may "learn" from the input and store additional markers 230 in order to avoid multiple identification candidates for the same object 220 in future identifications.

Additionally, the object recognition application 325 may utilize other bases for identification than identification algorithms. For instance, the object recognition application 325 may utilize the user's location, time of day, season, weather, speed of location changes (e.g., walking versus traveling), "busyness" (e.g., how many objects are in motion versus stationary in the video stream), as well any number of other conceivable factors in determining the identification of objects 220. Moreover, the user 202 may input preferences or other metrics for which the object recognition application 325 may utilize to narrow results of identified objects 220.

In some embodiments, the AR presentment application 321 may have the ability to gather and report user interactions with displayed virtual objects 400. The data elements gathered and reported may include, but are not limited to, frequented locations, objects within the frequented location, and variations of those objects. Such user interactions may be reported to any type of entity desired.

In some embodiments, the information provided by the real-time video stream may be compared to data provided to the system through an API. In this way, the data may be stored in a separate application and be implemented by request from the mobile device 204 and/or server.

FIG. 5 illustrates a process map for providing security information using a real-time video stream 500. At block 502 the user 202 views an object or frequented area. In additional embodiments, a real-time video stream may be captured from a mobile device at anytime; therefore the real-time video stream may capture the inside of the user's 202 pocket, a table, etc. In this way, the user 202 may capture real-time images and the system, through the use of factors, may determine if the user 202 is in a frequented area, such that the system may recognize variations with objects in that area. Once the user 202 enters frequented area or the mobile device 204 is positioned in a frequented area, the user 202 may point his mobile device 204 at the frequented area, as shown in block 504. In some embodiments, as discussed above, the user 202 may not need to point his mobile device 204, but instead the system may be "always on" such that the system continually sends and receives images through the real-time video stream.

At block 506 the user 202 may capture images of frequented areas or objects therein, as part of a real-time video stream. In some embodiments, the user 202 may point his/her mobile device 204 at a frequented area, such as a home, apartment, vehicle, person, relatives' homes, etc. In other embodiments, the user 202 may opt to have the system always on, such that frequented areas will continue to be captured and security will continued to be monitored via the system and indicators will be introduced for variances within the frequented area. Furthermore, the user 202 may be notified upon security compromises or security issues.

Once the user has captured images, the system may receive information associated with the image 508. The image may be a single frame of video (e.g., a screenshot), an entirety of a video, or any portion in between. Additionally, rather than video, the user 202 may opt to take a still picture of the environment. The image may further comprise of multiple single images compiled together. In some embodiments, the system may recognize the frequented area within the captured image.

Once the server application 224 or mobile device 204 receives the information associated with the image, the system may compile the data regarding objects and individuals in the frequented area, as illustrated in block 510. In this way, a baseline layout of the area may be established. In some embodiments, once the baseline layout has been established, the system may determine if the information associated with the image is a variation from the baseline layout of the frequented area. The baseline layout of the frequented area may be further established by factors.

At block 512 the system established a baseline for the frequented area based on factors. These factors include global position, compass position of mobile device 204 capturing image or video, infrared data, facial recognition, radiation detection, heat sensors (including indications of stress levels), mobile device recognition, electro-thermal sensors, object recognition, dimensional data, movement recognition, time of day, and the like. These factors allow the system to determine if an area is frequented by the user 202, the objects within the area, and the normal positioning of those objects. In this way, a baseline may be established such that when the area is captured again, the system may determine the variations in the objects and individuals within the area.

Global position and compass positioning provides an indication as to location of the frequented area, the crime rate in the area, the laws and regulations of the area, etc. Infrared data allows the system to visualize, through obstructions, all places of frequented areas of the user 202. Furthermore, in some embodiments, the infrared data may detect the locations of individuals or intruders in the frequented areas. For example, the system may recognize via infrared, that the family members of the user 202 sleeping in their beds. Therefore, if an individual is recognized in the frequented area, the system may recognize the individual as an intruder. Facial recognition provides an indication as to the identification of an individual's identification, such that the system may recognized and distinguish between an intruder and an individual that is not an intruder. Radiation detection may provide an indication of radioactive activity or other types of harmful chemicals within the frequented area. In this way, the user 202 may be notified of explosives or other possible harmful chemicals. Heat sensors may determine elevated heat levels of individuals. In this way, heat sensors may be able to predict robberies or the like prior to the robbery occurring. For example, the heat sensors may notice an individual within the user's 202 frequented area that has an elevated heat signature. The system may alert the user 202 of this elevated heat signature which may be a sign of stress or anxiousness in preparation to commit a crime. Mobile device recognition may recognize the mobile devices within a user's 202 frequented area. The system may access databases to determine the owner of the mobile devices within the user's 202 area. In this way, the system may alert the user 202 if a convicted criminal, sex offender, or the like is located in the user's 202 frequented area. Mobile device recognizers may also recognize computer processing chips, RFID chips, or the like. These may include chips that individuals have implanted within pets, themselves, etc.

The system reviews the existing frequented area, such that a baseline layout is established for the individuals and objects within the area are established at belonging or being normal to the area. That way, if one of those objects is broken or misplaced, the system may recognize that. Furthermore, the system may recognize individuals that may be allowed to be in the frequented area or individuals that may be intruders.

The system may the store the established baseline for the frequented areas in block 514. The baseline may be stored in a directory within the system based on the information sent to the system. For example, if the user 202 is using real-time video stream to identify his/her home, the data from the image the user 202 took may provide data to the server application 224 or the mobile device 204 such that the factors associated with home that have been previously analyzed may be known and compared for variations.

The directory comprises databases, as mentioned above, that have information relating to a verity of frequented areas of different users 202. The databases contain information about the frequented areas with respect to the factors and be able to instantly access the information regarding the frequented area when a new image of the frequented area is provided.

FIG. 6 illustrates a process map for providing security information 600, in accordance with some embodiments of the present invention. At block 602, after the system has determined frequented locations and their baseline layout in FIG. 5, the system may images of the frequented area. These images may be taken some time later than the baseline layout. The system receives these images and indicates variations of the frequented areas as compared to the baseline layout. These variations come from captured images, as part of a real-time video stream.

At block 604 the variations are analyzed to determine of they are security compromises or security issues. Analyzing the variation allows the system to determine the severity of the variation. For example, a high severity variation may include a security compromise, such as an intruder located in the frequented area. Whereas a low severity variation may include an unlocked door or open window.

If it is determined that the severity of the variation is high, then in decision block 606 the system may automatically send a communication to the proper authorities or first responders in block 608. For example, if a fire is detected in the frequented area, by an analysis of the factors, the high severity of that variation may trigger the system sending a communication to the fire department. Once the communication is made to the authorities, the user 202 is notified of the system's communication to the first responder in block 610.

If it is determined that the severity of the variation is not high enough to warrant a communication to authorities or first responders, the system makes a determination as to whether the mobile device 204 is still capturing video stream of the frequented area. If no video stream is being captured then no indicator is presented in block 614. If a video stream is still being captured, then in block 616 indicators are continuing to be presented with respect to variations within the frequented area. The indicators are associated with variations within the frequented area in a virtual area environment. In some embodiments, the virtual area environment may be in current time. In some embodiments, the system may provide the virtual area environment in future time. In yet other embodiments, the virtual area environment may be captured and the system may allow the user 202 to communicate the captured image via social networking, email, texting, or the like such that friends, family, authority, such as police and fire departments, and other individuals.

In some embodiments, the user 202 may select the indicator. The selected indicator may allow the user 202 to obtain further detail about the variation in the frequented area in block 618. In some embodiments, selecting the indicator provides the user 202 the ability to contact the appropriate authority based on the variation. For example, if the variation is a security compromise the system may allow the user 202 to contact the police. In some embodiments, as explained in detail above, the system may automatically contact the police if the security compromise is severe in nature.

If the user 202 selects the indicator in block 618, the user 202 may be provided further detail about the variation in the frequented area, such as the properties of the variation and the reason the system provided an indicator for it. The variation may be categorized as a security compromise, a security issue, or just a variation.

Furthermore, the indicator may provide a suggested response to the variation in block 620. The suggested response may comprise many different responses dependent on the variations associated with the indicator. For example, the responses may include, but are not limited to contacting authority, locking or shutting a door or a window, moving an object, stopping payment of financial accounts, etc. In yet other embodiments, the user 202 may be provided an offer to purchase the recommendation, such as new batteries for a smoke detector, a locking device for a door, etc. In block 622 the user may select the suggested response. Selecting the suggested response may include purchasing the suggested response if applicable. Purchasing the response via selecting the response on the indicator associated with the variation may be made by the user 202 using the mobile device 204, such as a mobile wallet (i.e., smart phone, PDA, etc.) or other types of payment options, such as credit cards, checks, cash, debit cards, loans, lines of credit, virtual currency, etc. that allows the user 202 to make a transaction to purchase an item associated with a suggested response.

In various embodiments, information associated with or related to one or more objects that is retrieved for presentation to a user via the mobile device may be permanently or semi-permanently associated with the object. In other words, the object may be "tagged" with the information. In some embodiments, a location pointer is associated with an object after information is retrieved regarding the object. In this regard, subsequent mobile devices capturing the object for recognition may retrieve the associated information, tags and/ or pointers in order to more quickly retrieve information regarding the object. In some embodiments, the mobile device provides the user an opportunity to post messages, links to information or the like and associate such postings with the object. Subsequent users may then be presenting such postings when their mobile devices capture and recognize an object. In some embodiments, the information gathered through the recognition and information retrieval process may be posted by the user in association with the object. Such tags and/or postings may be stored in a predetermined memory and/or database for ease of searching and retrieval.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

Thus, methods, systems, computer programs and the like have been disclosed that provide for using real-time video analysis, such as AR or the like to assist the user of mobile devices with commerce activities. Through the use real-time vision object recognition objects, logos, artwork, products, locations and other features that can be recognized in the real-time video stream can be matched to data associated with such to assist the user with commerce activity. The commerce activity may include, but is not limited to; conducting a transaction, providing information about a product/service, providing rewards based information, providing user-specific offers, or the like. In specific embodiments, the data that matched to the images in the real-time video stream is specific to financial institutions, such as user financial behavior history, user purchase power/transaction history and the like. In this regard, many of the embodiments herein disclosed leverage financial institution data, which is uniquely specific to financial institution, in providing information to mobile devices users in connection with real-time video stream analysis.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The systems, methods, computer program products, etc. described herein, may be utilized or combined with any other suitable AR-related application. Non-limiting examples of other suitable AR-related applications include those described in the following U.S. Provisional Patent Applications, the entirety of each of which is incorporated herein by reference:

| U.S. Provisional Ser. No. | Filed On | Title |
|---|---|---|
| 61/450,213 | Mar. 8, 2011 | Real-Time Video Image Analysis Applications for Commerce Activity |
| 61/478,409 | Apr. 22, 2011 | Presenting Offers on a Mobile Communication Device |
| 61/478,412 | Apr. 22, 2011 | Real-Time Video Analysis for Reward Offers |
| 61/478,394 | Apr. 22, 2011 | Real-Time Video Image Analysis for Providing Targeted Offers |
| 61/478,399 | Apr. 22, 2011 | Real-Time Analysis Involving Real Estate Listings |
| 61/478,402 | Apr. 22, 2011 | Real-Time Video Image Analysis for an Appropriate Payment Account |
| 61/478,405 | Apr. 22, 2011 | Presenting Investment-Related Information on a Mobile Communication Device |
| 61/478,393 | Apr. 22, 2011 | Real-Time Image Analysis for Medical Savings Plans |
| 61/478,397 | Apr. 22, 2011 | Providing Data Associated With Relationships Between Individuals and Images |
| 61/478,408 | Apr. 22, 2011 | Identifying Predetermined Objects in a Video Stream Captured by a Mobile Device |
| 61/478,400 | Apr. 22, 2011 | Real-Time Image Analysis for Providing Health Related Information |
| 61/478,411 | Apr. 22, 2011 | Retrieving Product Information From Embedded Sensors Via Mobile Device Video Analysis |
| 61/478,403 | Apr. 22, 2011 | Providing Social Impact Information Associated With Identified Products or Businesses |
| 61/478,407 | Apr. 22, 2011 | Providing Information Associated With an Identified Representation of an Object |
| 61/478,415 | Apr. 22, 2011 | Providing Location Identification of Associated Individuals Based on Identifying the Individuals in Conjunction With a Live Video Stream |
| 61/478,419 | Apr. 22, 2011 | Vehicle Recognition |
| 61/478,417 | Apr. 22, 2011 | Collective Network of Augmented Reality Users |
| 61/508,985 | Jul. 18, 2011 | Providing Information Regarding Medical Conditions |
| 61/508,946 | Jul. 18, 2011 | Dynamically Identifying Individuals From a Captured Image |
| 61/508,980 | Jul. 18, 2011 | Providing Affinity Program Information |
| 61/508,821 | Jul. 18, 2011 | Providing Information Regarding Sports Movements |
| 61/508,850 | Jul. 18, 2011 | Assessing Environmental Characteristics in a Video Stream Captured by a Mobile Device |
| 61/508,966 | Jul. 18, 2011 | Real-Time Video Image Analysis for Providing Virtual Landscaping |
| 61/508,969 | Jul. 18, 2011 | Real-Time Video Image Analysis for Providing Virtual Interior Design |
| 61/508,971 | Jul. 18, 2011 | Real-Time Video Image Analysis for Providing Deepening Customer Value |
| 61/508,764 | Jul. 18, 2011 | Conducting Financial Transactions Based on Identification of Individuals in an Augmented Reality Environment |
| 61/508,976 | Jul. 18, 2011 | Providing Retail Shopping Assistance |
| 61/508,944 | Jul. 18, 2011 | Recognizing Financial Document Images |

What is claimed is:

1. A method for providing security to a user, the method comprising:

receiving a captured first image of an area frequented by the user;

building a directory of data relating to the area frequented by the user, wherein the directory comprises information regarding non-human being objects and individuals within the area frequented by the user, wherein the directory of data is built using the captured first image of the area frequented by the user;

receiving a real-time video stream of the area frequented by the user subsequent to the directory of data being built;

recognizing variations between the directory of data from the captured first image of the area frequented by the user and real-time video stream of the area frequented by the user with the objects and the individuals within the area frequented by the user, through the use of a processor device;

superimposing selectable indicators associated with the variations over the real-time video stream of the area frequented by the user that is captured by a mobile device; and presenting the indicators associated with the variations superimposed on the real-time video stream, via the mobile device of the user, wherein the indicators provide a recommended security action based on the variations between the directory of data from the captured first image of the area frequented by the user and the real-time video stream of the area frequented by the user.

2. The method of claim 1, wherein the directory of data comprises information regarding the objects that are found within the area frequented by the user, wherein the information regarding the objects include information that the objects that are found within the area frequented by the user are identified as not presenting a security issue.

3. The method of claim 1, wherein the directory of data comprises information regarding the individuals that are found within the area frequented by the user, wherein the information regarding the individuals include information that the individuals that are found within the area frequented by the user are identified as not presenting a security issue.

4. The method of claim 1, wherein the receiving the real-time video stream of the area frequented by the user comprises real-time imaging of the area frequented by the user.

5. The method of claim 1, wherein the receiving the real-time video stream of the area frequented by the user comprises receiving real-time images of the area frequented by the user continuously while the mobile device is in the area frequented by the user.

6. The method of claim 1, wherein presenting an indicator associated with the variation comprises displaying the indicator on a display of the mobile device.

7. The method of claim 1, wherein the indicator is selectable by the user.

8. The method of claim 1, wherein the indicator, upon being selected, provides information regarding the variation based on security information related to the area frequented by the user.

9. A system for providing security to a user, comprising:

a memory device;

a communication device;

a processing device operatively coupled to the memory device and the communication device, wherein the processing device is configured to execute computer-readable program code to:

receive a captured first image of an area frequented by the user;

build a directory of data relating to the area frequented by the user, wherein the directory comprises information regarding non-human being objects and individuals within the area frequented by the user, wherein the directory of data is built using the captured first image of the area frequented by the user;

receive, via a mobile device, a real-time video stream of the area frequented by the user subsequent to the directory of data being built;

recognize variations between the directory of data from the captured first image of the area frequented by the user and real-time video stream of the area frequented by the user with the objects and the individuals within the area frequented by the user, through the use of a processor device;

superimpose selectable indicators associated with the variations over the real-time video stream of the area frequented by the user that is captured by a mobile device; and present the indicators associated with the variations superimposed on the real-time video stream, via the mobile device of the user, wherein the indicators provide a recommended security action based on the variations between the directory of data from the captured first image of the area frequented by the user and the real-time video stream of the area frequented by the user.

10. The system of claim 9, wherein the directory comprises information regarding the objects that are found within the area frequented by the user, wherein the information regarding the objects include information that the objects that are found within the area frequented by the user are identified as not presenting a security issue.

11. The system of claim 9, wherein the directory comprises information regarding the individuals that are found within the area frequented by the user, wherein the information regarding the individuals include information that the individuals that are found within the area frequented by the user are identified as not presenting a security issue.

12. The system of claim 9, wherein the receiving the real-time video stream of the area frequented by the user comprises real-time imaging of the area frequented by the user.

13. The system of claim 9, wherein the receiving the real-time video stream of the area frequented by the user comprises receiving real-time images of the area frequented by the user continuously while the mobile device is in the area frequented by the user.

14. The system of claim 9, wherein presenting an indicator associated with the variation comprises displaying the indicator on a display of the mobile device.

15. The system of claim 9, wherein the indicator is selectable by the user.

16. The system of claim 9, wherein the indicator, upon being selected, provides information regarding the variation based on security information related to the area frequented by the user.

17. A computer program product for providing security to a user, the computer program product comprising at least one non-transitory computer-readable medium having computer-readable program code portions embodied therein, the computer-readable program code portions comprising:

an executable portion configured for receiving a captured first image of an area frequented by the user;

an executable portion configured for building a directory of data relating to the area frequented by the user, wherein the directory comprises information regarding non-human being objects and individuals within the area frequented by the user, wherein the directory of data is built using the captured first image of the area frequented by the user;

an executable portion configured for receiving, via a mobile device, a real-time video stream of the area frequented by the user subsequent to the directory of data being built;

an executable portion configured for recognizing variations between the directory of data from the captured first image of the area frequented by the user and real-time video stream of the area frequented by the user with the objects and the individuals within the area frequented by the user, through the use of a processor device;

an executable portion configured for superimposing selectable indicators associated with the variations over the real-time video stream of the area frequented by the user that is captured by a mobile device; and an executable portion configured for presenting the indicators associated with the variations superimposed on the real-time video stream, via the mobile device of the user, wherein the indicators provide a recommended security action based on the variations between the directory of data from the captured first image of the area frequented by the user and the real-time video stream of the area frequented by the user.

18. The computer program product of claim 17, wherein the directory comprises information regarding the objects that are found within the area frequented by the user, wherein the information regarding the objects include information that the objects that are found within the area frequented by the user are identified as not presenting a security issue.

19. The computer program product of claim 17, wherein the directory comprises information regarding the individuals that are found within the area frequented by the user, wherein the information regarding the individuals include information that the individuals that are found within the area frequented by the user are identified as not presenting a security issue.

20. The computer program product of claim 17, wherein the receiving the real-time video stream of the area frequented by the user comprises real-time imaging of the area frequented by the user.

21. The computer program product of claim 17, wherein the receiving the real-time video stream of the area frequented by the user comprises receiving real-time images of the area frequented by the user continuously while the mobile device is in the area frequented by the user.

22. The computer program product of claim 17, wherein presenting an indicator associated with the variation comprises displaying the indicator on a display of the mobile device.

23. The computer program product of claim 17, wherein the indicator is selectable by the user.

24. The computer program product of claim 17, wherein the indicator, upon being selected, provides information regarding the variation based on security information related to the area frequented by the user.

* * * * *